United States Patent [19]
Daniels

[11] Patent Number: 5,946,896
[45] Date of Patent: Sep. 7, 1999

[54] FRUIT HARVESTING DEVICE

[76] Inventor: Michael Allen Daniels, 312 Bronco Dr., Zolfo Springs, Fla. 33890

[21] Appl. No.: 09/012,811

[22] Filed: Jan. 23, 1998

[51] Int. Cl.⁶ .................................................. A01D 46/26
[52] U.S. Cl. ............................ 56/328.1; 56/329; 56/330; 56/340.1
[58] Field of Search .................................. 56/328.1, 329, 56/330, 331, 340.1

[56] References Cited

U.S. PATENT DOCUMENTS

| | | | |
|---|---|---|---|
| 3,705,486 | 12/1972 | Chen et al. | 56/330 |
| 3,864,899 | 2/1975 | Lasswell | 56/328.1 |
| 4,383,400 | 5/1983 | Mead et al. | 56/233 |
| 4,418,521 | 12/1983 | Orlando | 56/330 |
| 5,074,107 | 12/1991 | Windemuller | 56/330 |

*Primary Examiner*—H. Shackelford
*Attorney, Agent, or Firm*—A. W. Fisher, III

[57] ABSTRACT

A fruit harvester comprising a plurality of oscillating fruit removal heads to selectively engage and vibrate the periphery of selected fruit-bearing sections of a fruit tree canopy thereby causing the fruit to break away from the fruit tree canopy wherein the oscillating fruit removal heads are pivotally coupled to an articulated telescoping boom mounted on a self propelled chassis including a plurality of fruit collection aprons and an internal fruit storage bin such that manipulation of the articulated telescoping boom permits engagement of isolated areas of the outer peripheral fruit-bearing sections of the fruit tree canopy by the oscillating fruit removal heads, each oscillating fruit removal head comprising a plurality of agitation wands rotatably and eccentrically coupled to a drive shaft of a motor such that rotation of the drive shaft is translated into lateral orbital motion of the oscillating fruit removal heads and a corresponding periodic motion of the isolated area of the peripheral fruit-bearing section of the fruit tree canopy with the orbital direction of the oscillating fruit removal heads in opposition to one another and the orbital radius and frequency of the oscillating fruit removal heads is modulated such that vibrations of the peripheral sections of the fruit tree canopy dampen or cancel one each other whereby the harmonic vibration between the peripheral fruit-bearing sections of the fruit tree and trunk is reduced as fruit is removed from the fruit tree canopy.

17 Claims, 6 Drawing Sheets

FRUIT HARVESTING DEVICE

BACKGROUND OF THE INVENTION

1. Field of the Invention

A fruit harvester comprising a plurality of oscillating fruit removal heads to selectively engage and vibrate the periphery of selected fruit-bearing sections of a fruit tree canopy thereby causing the fruit to break away from the fruit tree canopy.

2. Description of the Prior Art

Different approaches have been made in recent years to develop a harvesting machine that will rapidly and efficiently remove fruit from a tree without undue damage to the tree or immature fruit and blooms on the tree. Unfortunately no approach has been entirely successful. While it has appeared that shaking the tree is the most natural method, apparatus entering the tree to shake it at the trunk is known to cause damage to the root system of the tree, with possible loss of tree longevity and a reduction of fruit bearing. Other methods of trying to "auger" the fruit off the branches have broken limbs and caused excessive leaf damage/removal, as well as lost immature fruit and blossoms. "Shiners", or ripe fruit remaining on the tree, appear to be excessive and must be picked by hand.

U.S. Pat. No. 5,421,146 teaches a mechanical fruit harvester including a plurality of flexible probes which extend into the foliage of the tree. Each probe has retractable fingers for separating the fruit from the stem.

U.S. Pat. No. 5,161,358 shows a mechanical citrus apparatus comprising finger assemblies with tension producing and tension reducing abilities. As arms of the apparatus enter through limbs and foliage into the tree, the fingers depress, then reposition to correct angle for picking fruit. As the apparatus is withdrawn from the tree, the fingers engage stems of fruit bringing fruit up into intersection of the arm and the finger whereby pressure of the finger against stem causes separation of fruit from stem.

U.S. Pat. No. 4,377,064 comprises a rod press fruit harvester having a plurality of fruit removing rods combined with a mechanism for allowing movement of the harvester through a fruiting canopy without damage to limbs and branches of the tree.

U.S. Pat. No. 3,705,486 teaches a bush berry harvester having a carriage movable along the row and carrying a pair of tine grids movable in unison up and down to a selected elevation and movable in unison transversely toward and away from the bushes and also oscillatable in opposite phase in a fore and aft direction at variable amplitude and frequency to dislodge berries onto a conveyor leading to a berry cooler on the carriage.

U.S. Pat. No. 3,864,899 shows a fruit picking panel with a plurality of parallel disposed rotating spindles and a plurality of intermingled parallel disposed stationary spindles for penetrating the branches of a fruit-bearing tree. The rotating spindles have single-lobed cam-like elements intermediate the ends thereof to provide maximum openings for permitting easy penetration of the panel of spindles in and around the branches and the hanging fruit for a minimum of physical damage thereto and thereafter the rotation of the spindles carrying the cams causes the fruit to be gently squeezed between adjacent cams or between a cam and a stationary spindle to spin the fruit free of its attachment to the tree.

U.S. Pat. No. 4,222,219 relates to a fruit picking device similar to the device disclosed in '899.

U.S. Pat. No. 3,948,027 shows a mechanized harvester for tree-borne crops including a plurality of crop harvesting heads rotatably mounted on the end of an extendible boom. The boom, in turn, is rotatably mounted on a tractor.

U.S. Pat. No. 4,208,860 comprises a crop harvesting apparatus having a plurality of rotatable crop-severing rods of generally circular cross section extending from a support for insertion into crop-bearing foliage with the crop-securing rod longitudinal axes substantially parallel to the direction of thrust. The rods are formed of a rigid, flexible material and are rotated at speeds sufficient to cause the rods to flex to rotate orbitally about the stationary positions of their longitudinal axes. In a second embodiment, the crop-severing rods have frictional surfaces on at least the longitudinal outer portions thereof.

U.S. Pat. No. 4,163,355 teaches a crop harvesting apparatus for harvesting tree-borne crops including a plurality of crop-severing rods extending from a planar support member from which the rods are mounted for rotation. The rotating rods are thrust lengthwise into a crop-bearing plant and rotated, causing the crop-contacting surface portions to rotate orbitally to contact the crops to sever them from the plant. The crop-securing rods are mounted for orbital rotation on the outer cylindrical surface of a rotating cylinder, and in another embodiment the crop-severing rods extend from an end surface of a rotating cylinder, with the crop-severing rod longitudinal axis offset from the rotating cylinder longitudinal axis. In another embodiment, rigid, flexible crop-severing rods flex while rotating to rotate orbitally about the longitudinal axis of their mounting members.

U.S. Pat. No. 3,601,962 shows an attachment for a fruit harvester incorporating a plurality of rotary elements oriented in substantially vertical alignment with each rotary element including an offset beater in the form of a bar or tine which orbits about a rotational axis in a manner to engage fruit adjacent its connection with the stem for dislodging the fruit from the stem and causing the dislodged fruit to move in an outward trajectory in relation to the canopy of the tree toward the fruit harvester which serves as a device for catching and collecting the fruit.

U.S. Pat. No. 4,163,356 is an additional example of the fruit picking prior art. In contrast, the subject invention is configured to approximate the motion applied by the "hand picker". With a majority of the fruit growing in the outside three foot perimeter of the tree, the application of oscillating heads with extended probes or wands in the tree has been applied. As the fruit falls, it is collected and transferred to a "goat" (fruit collecting bin truck) by a simple inclined conveyor.

SUMMARY OF THE INVENTION

The present invention relates to a fruit harvester including a fruit removal assembly and multiple fruit collection aprons to collect and deposit harvested fruit into an internal fruit storage hopper. The internal fruit storage hopper includes an internal discharge conveyor to periodically unload harvested fruit into the body of a truck positioned next to the fruit harvester such that harvesting can take place in a substantially continuous operation along the length of a row of fruit trees.

The fruit removal assembly comprises a plurality of oscillating fruit removal heads to selectively engage and vibrate selected areas of the peripheral fruit-bearing section of a fruit tree canopy thereby causing the fruit to break away and fall from the fruit tree canopy. The fruit removal assembly is pivotally coupled to an articulated telescoping boom mounted on a turret rotatably mounted on a self propelled chassis. The turret includes an operator cab and hydraulic power unit which supplies hydraulic power to all moving structures of the fruit harvester. The self-propelled chassis is supported by independently steerable axles including independently powered wheels such that the fruit harvester can navigate a row of fruit trees while harvesting fruit from trees on each side thereof.

Each oscillating fruit removal head comprises a plurality of agitation wands extending outwardly from a subframe rotatably and eccentrically coupled to the drive shaft of a motor mounted on the fruit removal assembly. Rotation of the drive shaft is translated into the lateral orbital motion of the oscillating fruit removal heads and the corresponding periodic motion of selected fruit-bearing section of the fruit tree canopy. The orbital direction of the oscillating fruit removal heads are in opposition to one another and the orbital radius and frequency of the fruit removal heads is modulated such that vibrations of the peripheral sections of the fruit tree canopy cancel each other out whereby the harmonic vibration between the peripheral fruit-bearing sections and the trunk of the fruit tree is reduced.

Each wheel of the fruit harvester is powered by an independent hydraulic motor such that the position of the fruit harvester within a row of fruit trees can be continuously and precisely adjusted during harvesting. Through the coordinated positioning of the fruit harvester on the ground and manipulation of the turret and articulated telescoping boom, the fruit removal assembly selectively engages isolated areas of the fruit tree canopy with the oscillating fruit removal heads penetrating and agitating the outer peripheral fruit-bearing sections of the canopy. By manipulation of the pivotal connection between the fruit removal assembly and the articulated telescoping boom, the agitation wands selectively penetrate the fruit tree canopy at an angle selected by the operator to produce the desired degree of vibration in the fruit tree canopy.

The fruit collection apron are cantilevered from each side of the self propelled chassis to extend beneath the fruit tree canopy when the fruit harvester is positioned along side of the tree. As fruit is removed from the fruit tree canopy as a result of the vibrations of the fruit tree canopy induced by the oscillating fruit removal heads, the fruit is caught by the inclined floor of each of the fruit collection aprons and rolls by gravity to the lower uptake end of an inclined discharge elevator centrally disposed at the inner edge of each fruit collection apron. Each discharge elevator comprises an inclined belt conveyor having multiple flights transversely disposed along the length thereof to engage fruit and draw the fruit up the inclined belt conveyor. The discharge end of the inclined belt conveyor is positioned over a fruit storage hopper disposed within the interior of the open frame of the self propelled chassis.

The fruit storage hopper includes an inclined floor and sidewalls which cause fruit to collect in the front portion thereof. An inclined discharge conveyor is disposed at the front portion of the fruit storage hopper and extends outward from the front portion of the fruit harvester. A chute is formed in the upper end of the fruit harvester such that fruit can be periodically unloaded into the body of a truck positioned next the front portion of the fruit harvester. Further, an opening is formed in the back sidewall of the fruit storage bin to receive fruit dumped into the storage hopper by human fruit harvesters standing on the ground.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
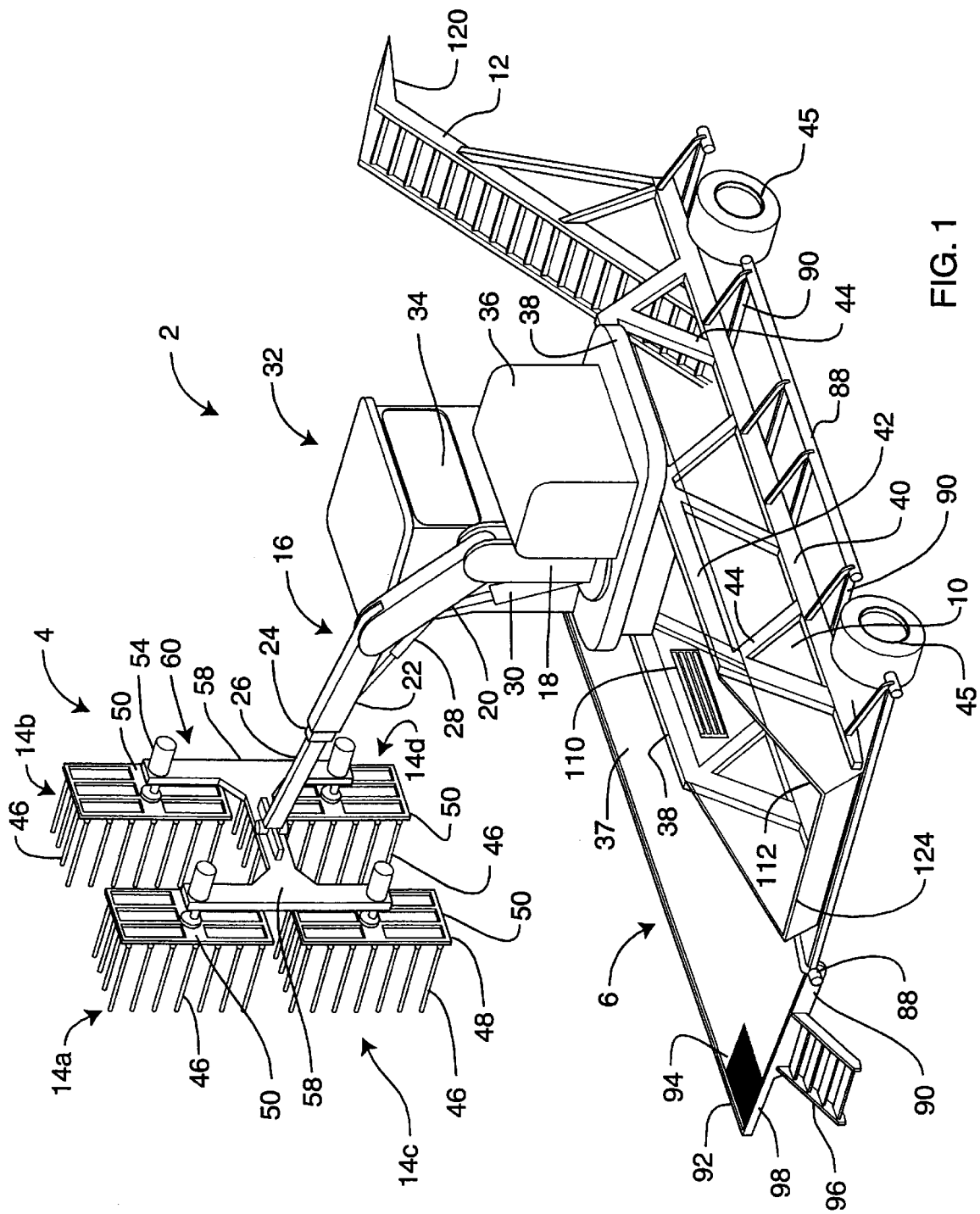
FIG. 1 is a perspective view of the fruit harverster of the present invention.
Figure 2:
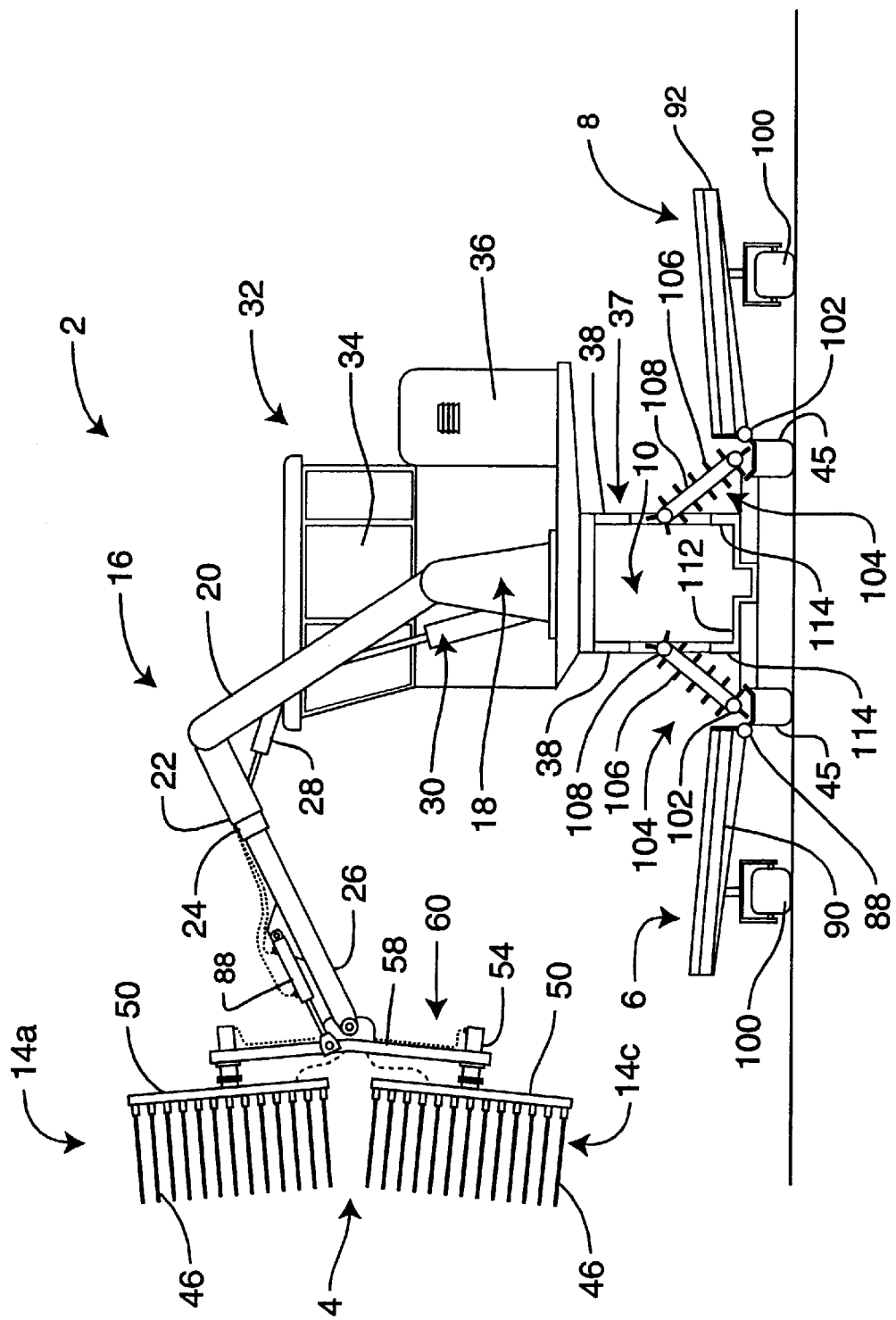
FIG. 2 is a side view of the articulated telescoping boom and oscillating fruit removal heads of the fruit harvester of the present invention.
Figure 3:
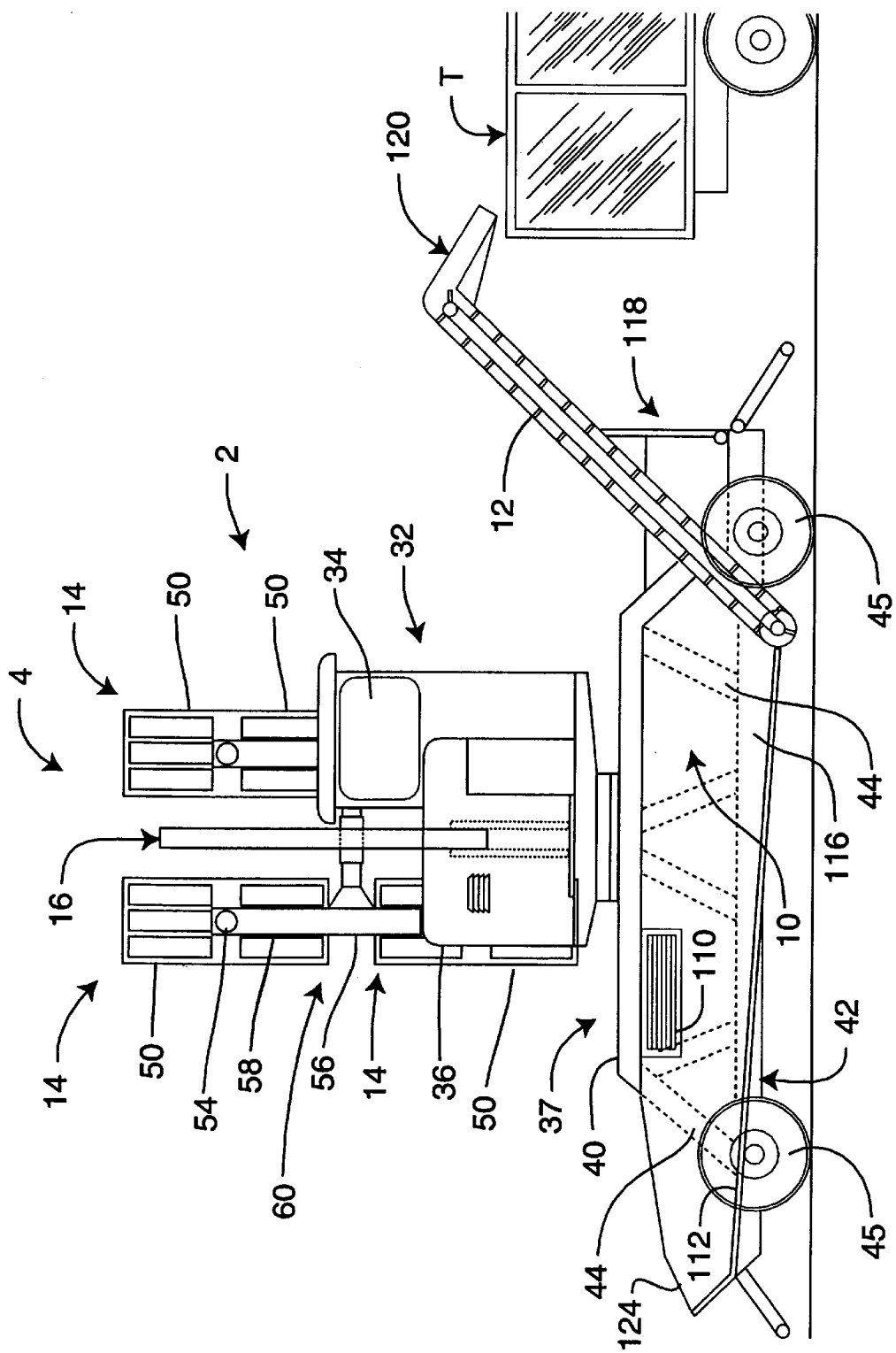
FIG. 3 is a rear view of the articulated telescoping boom and oscillating fruit removal heads of the fruit harvester of the present invention.

As shown in FIGS. 1 through 4, the present invention relates to a fruit harvester generally indicated as 2 including a boom mounted fruit removal assembly generally indicated as 4 and a pair of side fruit collection aprons generally indicated as 6 and 8 to collect and deposit harvested fruit into an internal fruit storage hopper generally indicated as 10. As best shown in FIG. 3, an inclined discharge conveyor 12 is disposed in operative relationship to the internal fruit storage hopper 10 to periodically unload harvested fruit into the body of a truck generally indicated as T positioned next to the fruit harvester 2 such that harvesting can take place in a substantially continuous operation along the length of a row of fruit trees.

Figure 4:
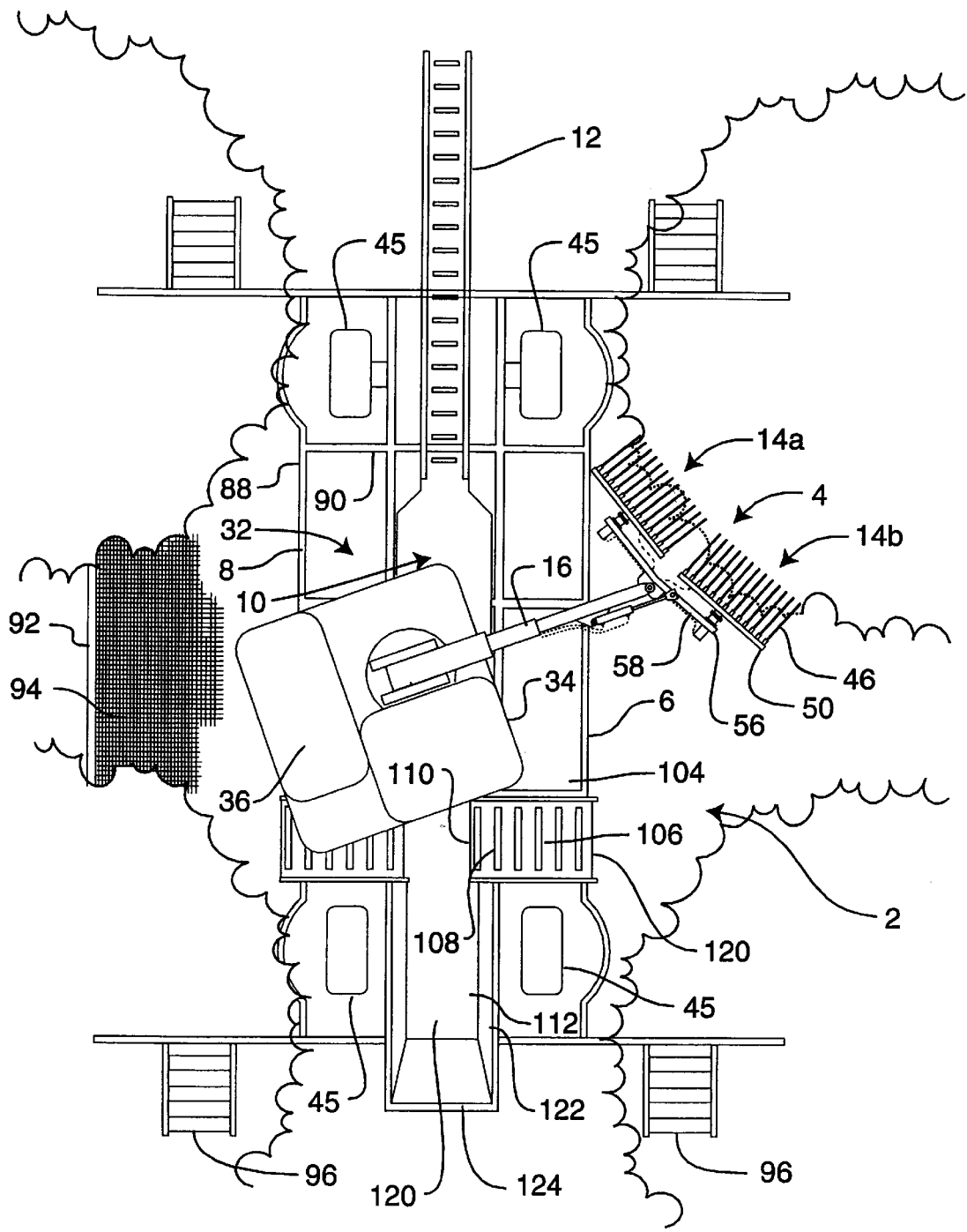
FIG. 4 is a top view of the fruit harvester of the present invention in a grove.

The fruit removal assembly 4 comprises a plurality of opposed oscillating fruit removal heads each generally indicated as 14 to selectively engage and vibrate selected areas of the peripheral fruit-bearing section of a fruit tree canopy thereby causing the fruit to break away and fall from the fruit tree canopy as best shown in FIG. 4. The fruit removal assembly 4 is pivotally mounted on an articulated telescoping boom generally indicated as 16. The articulated telescoping boom 16 includes a base 18 pivotally connected to a mast 20 which is, in turn, pivotally connected to a telescoping jib generally indicated as 22 comprising telescoping segments 24 and 26. As is common in the art of lifting cranes and excavating equipment, the articulation of the articulated telescoping boom 16 is affected and controlled by the coordinated operation of a first hydraulic cylinder 28 disposed in triangulated communication with the telescoping jib 22 and the mast 20 in combination with a second hydraulic cylinder 30 disposed in triangulated communication with the mast 20 and the base 18. The telescoping segments 24 and 26 of the jib 22 are similarly actuated by means of a hydraulic cylinder or cable system (not shown).

As best shown in FIGS. 1 and 2, the base 18 of the articulated telescoping boom 16 is disposed on a turret generally indicated as 32 including an operator cab 34 and a hydraulic power unit 36. The turret 32 is mounted on a spindle (not shown) operatively mounted to a fruit harvester chassis generally indicated as 37 such that the turret 32 can rotated through an angle of 360° on the fruit harvester chassis 37. As best shown in FIGS. 1 and 2, the fruit harvester chassis 37 comprises a substantial open frame including two substantially parallel lateral truss members each indicated as 38 each having a lower chord 40 and an upper chord 42 being joined by a plurality of web members each indicated as 44. The fruit harvester chassis 37 is supported by independently steerable axles (not shown) including independently powered wheels each indicated as 45 such that the fruit harvester 2 can independently navigate a row of fruit trees while harvesting fruit from trees on each side thereof.

Figure 5:
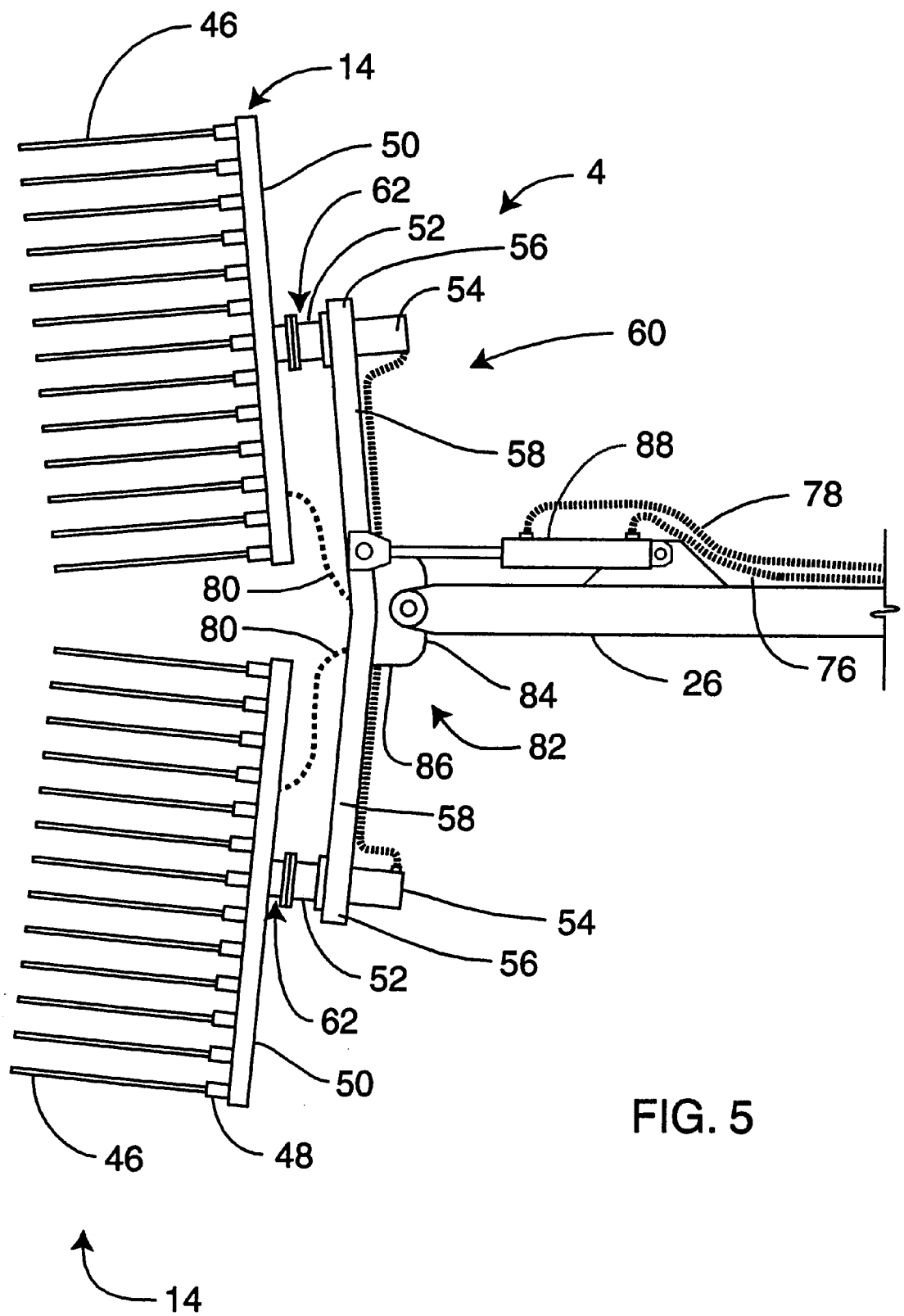
FIG. 5 is a top view of the articulated telescoping boom and oscillating fruit removal heads of the fruit harvester of the present invention.
Figure 6:
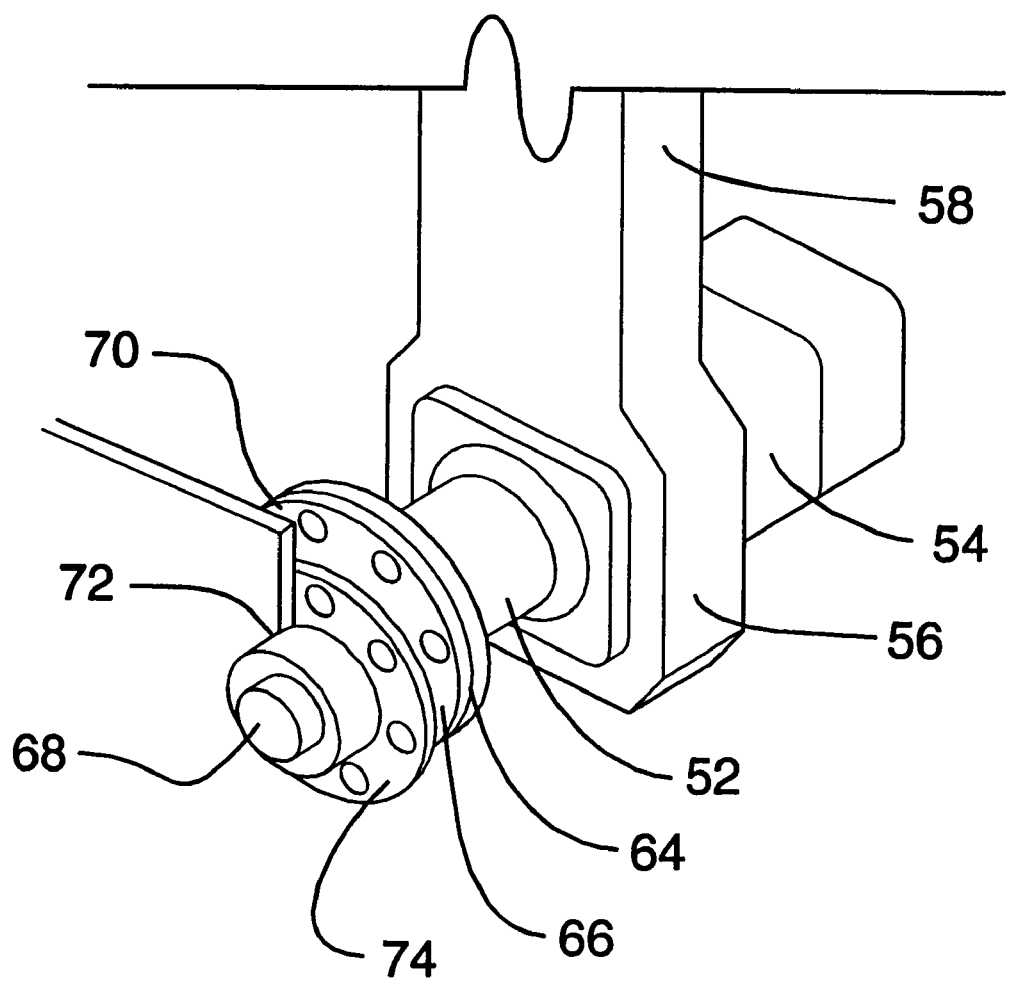
FIG. 6 is a detailed perspective view of the motor and the mounting plate for the subframe of the present invention.

As best shown in FIGS. 1 and 5, each oscillating fruit removal head 14 comprises a plurality of agitation wands each indicated as 46 received by a corresponding wand socket 48 formed in a corresponding subframe 50. As best shown in FIGS. 5 and 6, each subframe 50 is rotatably and eccentrically coupled to a corresponding drive shaft 52 of a corresponding motor 54 mounted in a motor mount 56 formed in the end portion of a corresponding vertical arm 58 of a corresponding "H" frame generally indicated as 60 of the fruit removal assembly 4. As shown in FIG. 6, each drive shaft 52 is connected to a corresponding coupler generally indicated as 62 comprising an inner plate 64 and an outer plate 66. A spindle 68 is formed on the outer surface 70 of the outer plate 66 in eccentric alignment with the drive shaft 52. The spindle 68 is received by a bearing 72 including a mounting plate 74 to receive the corresponding subframe 50 of the corresponding oscillating fruit removal head 14. Each drive shaft 52 is rotated by pressurized hydraulic fluid fed to the motor 54 from the hydraulic power unit 36. The hydraulic power unit 36 and the corresponding motor 54 are operatively coupled in fluid communication through a series of hydraulic supply lines 76 and hydraulic return lines 78.

Upon actuation of the motor 54, the rotation of the shaft 52 is translated into the lateral orbital motion of the corresponding oscillating fruit removal head 14 about the longitudinal axis of the shaft 52. A tether generally indicated as 80 such as a heavily damped spring or other resilient construction may be disposed between the subframes 50 and the "H" frame 60 to restrain the oscillating fruit removal heads 14 from contacting or engaging each other. As best shown in FIG. 1, the orbital direction of the oscillating fruit removal heads 14 are in substantial opposition to one another such that the harmonic vibrations created between the oscillating fruit removal heads 14 are avoided.

Each powered wheel 45 of the fruit harvester 2 is powered by an independent hydraulic motor (not shown) such that the position of the fruit harvester 2 can be continuously and precisely adjusted during harvesting. As best shown in FIG. 4, when the fruit harvester 2 is properly positioned on the ground by the coordinated manipulation of the turret 32 and the articulated telescoping boom 16, the fruit removal assembly 4 selectively engages isolated areas of the fruit tree canopy with the agitation wands 46 penetrating and vibrating the outer peripheral fruit-bearing sections of the fruit tree canopy.

As best shown in FIG. 5, adjustment or relative movement between the fruit removal assembly 4 and the articulated boom 16 is effected by an articulated joint generally indicated as 82 including a vertical hinge 84 and a horizontal hinge 86. As with the articulated telescoping boom 16, manipulation of the fruit removal assembly 4 is accomplished by a hydraulic cylinder 88 in triangulated communication with the "H" frame 60 and the telescoping section 26 of the telescoping jib 22 across the vertical hinge 84 and a second hydraulic cylinder (not shown) in triangulated communication with the H" frame 60 and the telescoping section 26 of the jib 22 across the horizontal hinge 86. By coordinated manipulation of the vertical hinge 84 and the horizontal hinge 86 together with the articulated telescoping boom 16, the agitation wands 46 selectively penetrate the fruit tree canopy at an angle selected by the operator to transmit the orbital motion of the oscillating fruit removal heads 14 into the periodic motion of an isolated section of the fruit tree canopy. As described above, the orbital direction of the individually oscillating fruit removal heads 14 are in opposition to one another, and the orbital radius and frequency of the oscillating fruit removal heads 14 are modulated such that vibrations of the peripheral sections of the fruit tree canopy cancel one another such that harmonic vibration between the peripheral fruit-bearing sections of the fruit tree and the trunk is reduced.

As shown in FIGS. 1, 2 and 4, the side fruit collection aprons 6 and 8 are cantilevered from each side of the fruit harvester chassis 37 on a corresponding hinge pin 88 on each side of the fruit harvester chassis 37 by a plurality of lateral frame members each indicated as 90 and extending beneath the canopy of a fruit tree when the fruit harvester 2 is positioned along side of the tree. As best shown in FIGS. 1 and 4, each side fruit collection aprons 6 and 8 comprises a general open frame 92 supporting a collection surface 94 constructed of expanded metal or wire mesh. A step 96 is formed in the trailing edge 98 of the side fruit collection aprons 6 and 8 to provide access to the fruit harvester 2. As shown in FIG. 2, a plurality of support wheels each indicated as 100 is provided under the center of each of the side fruit collection aprons 6 and 8 to support and stabilize the fruit collection aprons 6 and 8 and the fruit harvester 2. As best shown in FIGS. 2 and 4, the collection surface 94 of each of the side fruit collection apron 6 and 8 is inclined towards the center line of the fruit harvester chassis 37 such that harvested fruit falling from the tree canopy onto the fruit collection aprons 6 and 8 collect at the lower uptake end portion 102 of a belt conveyor generally indicated as 104. The belt conveyor 104 comprises a conveyor of construction typical in the art for conveying fruit but includes a plurality of transverse flights each indicated as 106 disposed along the surface of the belt 108 to engage and lift fruit in the direction of travel of the belt 108. The upper discharge end 110 of each belt conveyor 104 extends upward through the corresponding lateral truss member 38 of the fruit harvester chassis 37 and over the internal fruit storage storage hopper 10. As the amount of fruit collecting on the side fruit collection aprons 6 and 8 increases, the belt conveyors 104 can be selectively actuated to discharge fruit from the side fruit collection aprons 6 and 8 into the internal fruit storage hopper 10 within the fruit harvester chassis 37.

The internal fruit storage hopper 10 includes an inclined floor 112 and a pair of side walls each indicated as 114 which cause fruit to collect in the front end portion 116 of the internal fruit storage hopper 10. The inclined floor 112 and the side walls 114 can be constructed of expanded metal or wire mesh fastened to the lateral truss members 38 and the lateral members (not shown) interconnecting the lateral truss members 38. The inclined discharge conveyor 12 is similar in structure and operation to the belt conveyors 104 and is disposed at the front end portion 116 of the internal fruit storage hopper 10 and extends outward from the front end portion 118 of the fruit harvester 2. A chute 120 is formed in the upper end portion of the fruit harvester 2 such that fruit can be periodically unloaded into the body of a truck 14 positioned adjacent the fruit harvester 2. The end wall 120 of the internal fruit storage hopper 10 towards the rear end portion 122 of the fruit harvester 2 is lowered and extended to form an intake chute 124 to receive fruit dumped into the internal fruit storage hopper 10 by human fruit harvesters standing on the ground.

As best shown in FIG. 1, the direction of movement of each oscillating fruit removal head 14 is selected to balance the opposing movement thereof to stabilize the fruit removal assembly 4. Specifically, the first and second upper oscillating fruit removal head 14a and 14b respectively move in opposite directions relative to each other or in a clockwise and counter-clockwise direction respectively; while, the first and second lower oscillating fruit removal heads 14c and 14d respectively move in opposite directions relative to each other or in a counter-clockwise and clockwise direction respectively. Thus the first upper and second lower oscillating fruit removal heads 14a and 14d rotate in a first or clockwise direction and the second upper and first lower oscillating fruit removal heads 14b and 14c rotate in a second or counter-clockwise direction.

As best shown in FIG. 4, the first upper and first lower oscillating fruit removal heads 14a and 14c and the second upper and second lower oscillating fruit removal heads 14b and 14d are angled inwardly toward each other at an angle of approximately 10 degrees the vertical or near vertical plane.

As best shown in FIG. 2, the first and second upper oscillating fruit removal heads 14a and 14b and the first and second lower oscillating fruit removal heads 14c and 14d are angled inwardly toward each other at an angle of approximately 5 degrees relative in the vertical plane.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fruit harvester comprising a fruit removal assembly including at least one pair of oscillating fruit removal heads to selectively engage and vibrate isolated areas of the peripheral fruit-bearing section of a fruit tree canopy thereby causing the fruit to break away from the fruit tree canopy, each said oscillating fruit removal heads comprising a plurality of agitation wands rotatively and eccentrically coupled to a drive shaft of a motor mounted on said fruit removal assembly such that rotation of a drive shaft is translated into the orbital motion of said oscillating fruit removal heads and a corresponding periodic motion of an isolated area of the peripheral fruit-bearing section of the fruit tree canopy wherein the orbital motion of said oscillating fruit removal heads is within a vertical or near vertical plane such that the distal ends of said agitation wands remain at a substantially constant distance from the trunk of the fruit tree.

2. The fruit harvester of claim 1 wherein the orbital motion of said oscillating fruit removal heads is opposite in directions relative to each other such that harmonic vibration between the peripheral fruit-bearing sections of the fruit tree and fruit tree trunk is reduced.

3. The fruit harvester of claim 1 comprising a first and second upper oscillating fruit removal head moving in opposite directions relative to each other and a first and second lower oscillating fruit removal heads moving in opposite directions relative to each other.

4. The fruit harvester of claim 1 comprising a first upper and first lower oscillating fruit removal head and a second upper and second lower oscillating fruit removal heads angled inwardly toward each other at an angle of approximately 10 degrees relative to a vertical plane.

5. The fruit harvester of claim 1 wherein the radius and frequency of the orbital motion of the oscillating fruit removal heads are modulated to induce periodic motion of isolated sections of a fruit tree of optimum frequency and vibration for the species and size of tree from which fruit is being harvested.

6. The fruit harvester of claim 1 wherein said fruit removal assembly is pivotally disposed on a boom mounted on a turret rotatingly disposed on a self propelled chassis.

7. The fruit harvester of claim 6 wherein said self propelled chassis has at least one fruit collection apron to catch and collect harvested fruit falling from the canopy of the fruit tree.

8. The fruit harvester of claim 6 further including a fruit storage hopper disposed to receive picked fruit from said fruit collection apron.

9. The fruit harvester of claim 6 wherein said boom comprises a plurality of segments disposed in telescoping relationship relative to each other and coupled to said turret to selectively position said fruit removal assembly to engage of isolated areas of the outer peripheral fruit-bearing sections of the fruit tree canopy whereby said oscillating fruit removal heads engage the fruit in the fruit tree canopy.

10. The fruit harvester of claim 7 wherein said fruit collection apron includes an inclined floor in operative communication with a fruit storage hopper disposed within said fruit harvester chassis.

11. The fruit harvester of claim 10 further including a belt conveyor in operative communication with said fruit collection apron and said fruit storage hopper to selectively transport harvested fruit from said fruit collection apron and to said fruit storage hopper.

12. The fruit harvester of claim 11 wherein said integral fruit storage hopper includes an inclined floor to collect harvested fruit at one end thereof and a fruit discharge conveyor to selectively remove harvested fruit from said fruit harvester.

13. The fruit harvester of claim 12 wherein said fruit discharge conveyor extends upwardly and outwardly from the front of said fruit harvester such that the body of a truck may be positioned beneath the upper end portion of said fruit discharge conveyor to receive fruit discharged from said fruit harvester.

14. The fruit harvester of claim 12 wherein said fruit discharge conveyor further includes an auxiliary fruit storage hopper located at the discharge end of said fruit discharge conveyor.

15. The fruit harvester of claim 12 wherein said fruit collection hopper includes a fruit reception chute to received harvester fruit placed in said fruit storage hopper by human harvesters.

16. The fruit harvester of claim 3 wherein said first upper and second lower oscillating fruit removal heads rotate in a first direction and said second upper and first lower oscillating fruit removal heads rotate in a second direction.

17. The fruit harvester of claim 4 wherein said first and second upper oscillating fruit removal heads and said first and second lower oscillating fruit removal heads are angled inwardly toward each other at an angle of approximately 5 degrees relative to a vertical plane.

* * * * *